US012304459B2

(12) United States Patent
Adiththan et al.

(10) Patent No.: US 12,304,459 B2
(45) Date of Patent: May 20, 2025

(54) SYSTEM AND METHOD FOR CONTEXT ORIENTED AUTO PARK ASSIST

(71) Applicant: GM Global Technology Operations LLC, Detroit, MI (US)

(72) Inventors: Arun Adiththan, Sterling Heights, MI (US); Md Mhafuzul Islam, Warren, MI (US); Prakash Mohan Peranandam, Rochester Hills, MI (US); Sachin Raviram, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 326 days.

(21) Appl. No.: 18/053,931

(22) Filed: Nov. 9, 2022

(65) Prior Publication Data
US 2024/0149866 A1     May 9, 2024

(51) Int. Cl.
*B60W 30/06* (2006.01)
*B60W 50/10* (2012.01)

(52) U.S. Cl.
CPC ............ *B60W 30/06* (2013.01); *B60W 50/10* (2013.01); *B60W 2420/408* (2024.01); *B60W 2420/54* (2013.01); *B60W 2556/65* (2020.02)

(58) Field of Classification Search
CPC .. B60W 30/06; B60W 50/10; B60W 2556/65; B60W 2420/408; B60W 2420/54
See application file for complete search history.

(56) References Cited

U.S. PATENT DOCUMENTS

| | | | | |
|---|---|---|---|---|
| 10,657,817 | B2 * | 5/2020 | Schoenherr | G08G 1/096741 |
| 11,884,265 | B1 * | 1/2024 | Suzuki | G08G 1/143 |
| 2018/0208244 | A1 * | 7/2018 | Nakayama | B62D 15/0285 |
| 2020/0250977 | A1 * | 8/2020 | Kim | G06V 20/586 |
| 2020/0398825 | A1 * | 12/2020 | Tsujino | G06V 20/58 |
| 2021/0300342 | A1 * | 9/2021 | Hara | B62D 15/0285 |
| 2021/0303881 | A1 * | 9/2021 | Hara | B60K 35/22 |
| 2021/0354689 | A1 * | 11/2021 | Schreiber | G01S 13/867 |
| 2021/0394783 | A1 * | 12/2021 | Meier-Arendt | B60Q 5/005 |
| 2022/0073056 | A1 * | 3/2022 | H?ger | G05D 1/0234 |
| 2022/0198928 | A1 * | 6/2022 | Liu | G01C 21/28 |

(Continued)

*Primary Examiner* — Peter D Nolan
*Assistant Examiner* — Mikko Okechukwu Obioha
(74) *Attorney, Agent, or Firm* — Vivacqua Crane, PLLC (57) ABSTRACT

A system for context-oriented auto park assist includes sensor, communication, and vehicle control sub-systems. Each sub-systems has control modules having processors, memories, and input/output (I/O) ports. The I/O ports of the sensor and communication sub-systems are in communication with the vehicle control system. The control modules execute program code portions stored in the memory including a program code portions that generates occupant, environmental, time and location, and vehicle contexts, and a combined context by combining the occupant, environmental, location and time, and vehicle contexts. The system scans a parking area for candidate parking spots by applying the combined context vector as the vehicle is driven through the parking area. The system informs vehicle occupants of the presence of candidate parking spots, and upon receiving an input from the vehicle occupants, performs one or more automated driver assistance system (ADAS) actions through the vehicle control system to park the vehicle.

19 Claims, 4 Drawing Sheets

(56) References Cited

U.S. PATENT DOCUMENTS

| | | | | |
|---|---|---|---|---|
| 2023/0137808 A1* | 5/2023 | Avedisov | ............... | G08G 1/162 |
| | | | | 701/117 |
| 2023/0234560 A1* | 7/2023 | Choi | .................. | B62D 15/0285 |
| 2024/0375685 A1* | 11/2024 | Kiyokawa | .............. | G08G 1/168 |

\* cited by examiner

SYSTEM AND METHOD FOR CONTEXT ORIENTED AUTO PARK ASSIST

INTRODUCTION

The present disclosure relates generally to advanced driver assistance systems (ADAS) for vehicles, and more particularly to ADAS systems utilized to park a vehicle and to determine parking locations for the vehicle.

Smart car technologies such as free-ranging on grid navigation, as well as parking guidance and information systems, aid in the prevention of human error when drivers operate a vehicle. Such technologies have been used to improve navigation of roadways, and to augment the parking abilities of vehicle drivers while the drivers are present within the vehicle. For example, rear view camera systems and cross-traffic alert systems, and impact alert systems have been developed to assist the operator of the vehicle while parking to avoid collisions. In addition, autonomous parking systems have been developed that autonomously park the vehicle in a parking spot once the operator of the vehicle has positioned the vehicle in a predefined location proximate the parking spot.

While these systems achieve their intended purpose, there is a need for a new and improved system and method for context oriented auto park assistance that is platform agnostic, improves accuracy and robustness of parking systems, reduces complexity and reduces the potential for user or operator errors, while providing additional redundant ease of access and safety features.

SUMMARY

According to several aspects, a system for context-oriented auto park assist in a vehicle includes a sensor sub-system, a communication sub-system, and a vehicle control system. Each of the sensor sub-system, the communication sub-system, and the vehicle control system has one or more control modules. The one or more control modules each have a processor, a memory, and input/output (I/O) ports. The I/O ports of each of the sensor sub-system and the communication sub-system in communication with the vehicle control system; the control modules executing program code portions stored in the memory. The program code portions include a first program code portion that generates an occupant context, and a second program code portion that generates an environmental context from information received by the sensor sub-system. A third program code portion generates a time and location context from information received by the communication sub-system and the sensor sub-system. A fourth program code portion generates a vehicle context from predefined vehicle characteristics. A fifth program code portion generates a combined context vector by combining the occupant context, the environmental context, the time and location context, and the vehicle context. A sixth program code portion scans a parking area for candidate parking spots, and the candidate parking spots are determined by applying the combined context vector as the vehicle is driven through the parking area. A seventh program code portion informs vehicle occupants of the presence of candidate parking spots. Upon receiving an input from the vehicle occupants, an eighth program code portion performs one or more automated driver assistance system (ADAS) actions through the vehicle control system to park the vehicle.

In another aspect of the present disclosure, the sensor sub-system further includes one or more sensors disposed on the vehicle. The one or more sensors include: Light Detection and Ranging (LIDAR) sensors, Radio Detection and Ranging (RADAR) sensors, Sound Navigation and Ranging (SONAR) sensors, cameras, ultrasonic sensors, inertial measurement units (IMUs), and Global Positioning System (GPS) sensors, vehicle-to-vehicle (V2V) systems and sensors, and Vehicle-to-Infrastructure (V2I) systems and sensors.

In yet another aspect of the present disclosure the first program code portion further includes program code that receives occupant data from one or more of: a manual occupant input to a human-machine interface (HMI) via touch inputs, gesture inputs; and an automatic occupant input. The automatic occupant input includes: pre-trip settings in a mobile application on an occupant's mobile device, pre-trip settings stored within memory of the control module, and information retrieved from a computer vision or machine-learning occupant recognition system.

In still another aspect of the present disclosure the occupant data includes physical characteristics of the vehicle occupants, cargo loading or unloading status of the vehicle, and quantities of occupants.

In yet another aspect of the present disclosure the second program code portion further includes program code that retrieves environmental context information from sensors equipped to the sensor sub-system of the vehicle. The environmental context information further includes text identifiers including verbiage on signs and on surfaces within a predefined area surrounding the vehicle. The environmental context information further includes object identifiers indicating the presence of physical objects within the predefined area surrounding the vehicle.

In still another aspect of the present disclosure the third program code portion further includes program code that generates the time and location context from: time and date information stored within vehicle memory; and location information received from one or more of the RADAR sensors, SONAR sensors, LIDAR sensors, ultrasonic sensors, cameras, IMUs, V2V systems and sensors, and V2I systems and sensors.

In yet another aspect of the present disclosure the predefined vehicle characteristics include physical dimensions of the vehicle, vehicle dynamics system characteristics and capabilities, and performance characteristics of the vehicle.

In still another aspect of the present disclosure the sixth program code portion further includes a program code portion that applies constraints to the combined context vector. The constraints include text identifiers, object identifiers, predefined vehicle characteristics, and physical dimensions of accessories attached to the vehicle.

In yet another aspect of the present disclosure the seventh program code portion further includes generating a prompt to vehicle occupants, wherein the prompt is displayed on the HMI, and the prompt offers occupants opportunities to park the vehicle within one or more candidate parking spots. Upon receiving an occupant input to select a candidate parking spot, the system performs the eighth program code portion to park the vehicle, and upon not receiving an occupant input to select a candidate parking spot, or upon not detecting a candidate parking spot, the system increments an iteration counter and continues to scan the parking area.

In still another aspect of the present disclosure the eighth program code portion further includes engaging the vehicle control system to perform an ADAS action to park the vehicle or to assist vehicle occupants in manually parking the vehicle by providing environmental context based alerts to the occupants as the occupants manually park the vehicle.

In yet another aspect of the present disclosure a method for context-oriented auto park assist in a vehicle includes utilizing one or more control modules having a processor, a memory, and input/output (I/O) ports, the control modules executing program code portions stored in the memory. The program code portions generating an occupant context, generating an environmental context from information received by a sensor sub-system of the vehicle, and generating a time and location context from information received by a communication sub-system of the vehicle and the sensor sub-system. The program code portions further generate a vehicle context from predefined vehicle characteristics, and generate a combined context vector by combining the occupant context; the environmental context, the time and location context, and the vehicle context. The method scans a parking area for candidate parking spots. The candidate parking spots are determined by applying the combined context vector as the vehicle is driven through the parking area. The method informs vehicle occupants of the presence of candidate parking spots; and upon receiving an input from the vehicle occupants, performs one or more automated driver assistance system (ADAS) actions through a vehicle control system to park the vehicle. The I/O ports of each of the sensor sub-system, and the communication sub-system are in communication with the vehicle control system.

In still another aspect of the present disclosure the method generates an environmental context from information received by a sensor sub-system of the vehicle by collecting sensor data from one or more sensors of the sensor sub-system. The one or more sensors include: Light Detection and Ranging (LIDAR) sensors, Radio Detection and Ranging (RADAR) sensors, Sound Navigation and Ranging (SONAR) sensors, cameras, ultrasonic sensors, inertial measurement units (IMUs), and Global Positioning System (GPS) sensors, vehicle-to-vehicle (V2V) systems and sensors, and Vehicle-to-Infrastructure (V2I) systems and sensors.

In yet another aspect of the present disclosure the method receives occupant data from one or more of: a manual occupant input to a human-machine interface (HMI) via touch inputs, gesture inputs; and an automatic occupant input. The automatic occupant input includes: pre-trip settings in a mobile application on an occupant's mobile device, pre-trip settings stored within memory of the control module, and information retrieved from a computer vision or machine-learning occupant recognition system.

In still another aspect of the present disclosure, receiving occupant data further includes receiving physical characteristics of the vehicle occupants, cargo loading or unloading status of the vehicle, and quantities of occupants.

In yet another aspect of the present disclosure the method further includes receiving environmental context information from sensors equipped to the sensor sub-system of the vehicle. The environmental context information further includes text identifiers including verbiage on signs, and on surfaces within a predefined area surrounding the vehicle; and object identifiers indicating the presence of physical objects within the predefined area surrounding the vehicle.

In still another aspect of the present disclosure, the method further includes generating time and location context from: time and date information stored within vehicle memory, and generating location information received from one or more of the RADAR sensors, SONAR sensors, LIDAR sensors, ultrasonic sensors, cameras, IMUs, V2V systems and sensors, and V2I systems and sensors.

In yet another aspect of the present disclosure generating a vehicle context from predefined vehicle characteristics further includes retrieving physical dimensions of the vehicle, vehicle dynamics system characteristics and capabilities, and performance characteristics of the vehicle; and applying constraints to the combined context vector. The constraints include text identifiers, object identifiers, predefined vehicle characteristics, and physical dimensions of accessories attached to the vehicle.

In still another aspect of the present disclosure the method includes generating a prompt to vehicle occupants. The prompt is displayed on the HMI, and the prompt offers occupants opportunities to park the vehicle within one or more candidate parking spots. Upon receiving an occupant input to select a candidate parking spot, the system performs one or more automated driver assistance system (ADAS) actions through a vehicle control system to park the vehicle. Upon not receiving an occupant input to select a candidate parking spot, or upon not detecting a candidate parking spot, the system increments an iteration counter and continues to scan the parking area.

In yet another aspect of the present disclosure, the method includes engaging the vehicle control system to perform an ADAS action to park the vehicle or to assist vehicle occupants in manually parking the vehicle by providing environmental context based alerts to the occupants as the occupants manually park the vehicle.

In still another aspect of the present disclosure, a system for context-oriented auto park assist in a vehicle includes a sensor sub-system having one or more sensors disposed on the vehicle. The one or more sensors include Light Detection and Ranging (LIDAR) sensors, Radio Detection and Ranging (RADAR) sensors, Sound Navigation and Ranging (SONAR) sensors, cameras, ultrasonic sensors, inertial measurement units (IMUs), and Global Positioning System (GPS) sensors, vehicle-to-vehicle (V2V) systems and sensors, and Vehicle-to-Infrastructure (V2I) systems and sensors. The system further includes a communication sub-system and a vehicle control system. Each of the sensor sub-system, the communication sub-system, and the vehicle control system includes one or more control modules having a processor, a memory, and input/output (I/O) ports. The I/O ports of each of the sensor sub-system, and the communication sub-system are in communication with the vehicle control system. The control modules execute program code portions stored in the memory. The program code portions include a first program code portion that generates an occupant context from occupant data including one or more of: a manual occupant input to a human-machine interface (HMI) via touch inputs, gesture inputs; and an automatic occupant input. The automatic occupant input includes: pre-trip settings in a mobile application on an occupant's mobile device, pre-trip settings stored within memory of the control module, and information retrieved from a computer vision or machine-learning occupant recognition system. The occupant data includes physical characteristics of the vehicle occupants, cargo loading or unloading status of the vehicle, and quantities of occupants. A second program code portion generates an environmental context from information detected by sensors equipped to the sensor sub-system of the vehicle. The environmental context information further includes: text identifiers including verbiage on signs, and on surfaces within a predefined area surrounding the vehicle; and object identifiers indicating the presence of physical objects within the predefined area surrounding the vehicle. A third program code portion generates a time and location context from time and date information stored within vehicle memory and location information received from one or more of the RADAR sensors, SONAR sensors, LIDAR sensors, ultrasonic sensors, cameras, IMUs, V2V systems and sensors, and V2I systems and sensors. A fourth program code portion generates a vehicle context from predefined vehicle characteristics including: physical dimensions of the vehicle, vehicle dynamics system characteristics and capabilities, and performance characteristics of the vehicle. A fifth program code portion generates a combined context vector by combining the occupant context, the environmental context, the time and location context, and the vehicle context. A sixth program code portion scans a parking area for candidate parking spots. The candidate parking spots are determined by applying constraints to the combined context vector as the vehicle is driven through the parking area. The constraints include text identifiers, object identifiers, predefined vehicle characteristics, and physical dimensions of accessories attached to the vehicle. A seventh program code portion informs vehicle occupants of the presence of candidate parking spots by generating a prompt to vehicle occupants. The prompt is displayed on the HMI, and the prompt offers occupants opportunities to park the vehicle within one or more candidate parking spots. Upon receiving an occupant input to select a candidate parking spot, the system performs the eighth program code portion to park the vehicle. Upon not receiving an occupant input to select a candidate parking spot, or upon not detecting a candidate parking spot, the system increments an iteration counter and continues to scan the parking area. Upon receiving an input from the vehicle occupants, the eighth program code portion performs one or more automated driver assistance system (ADAS) actions through the vehicle control system to park the vehicle or assists vehicle occupants in manually parking the vehicle by providing environmental context based alerts to the occupants as the occupants manually park the vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
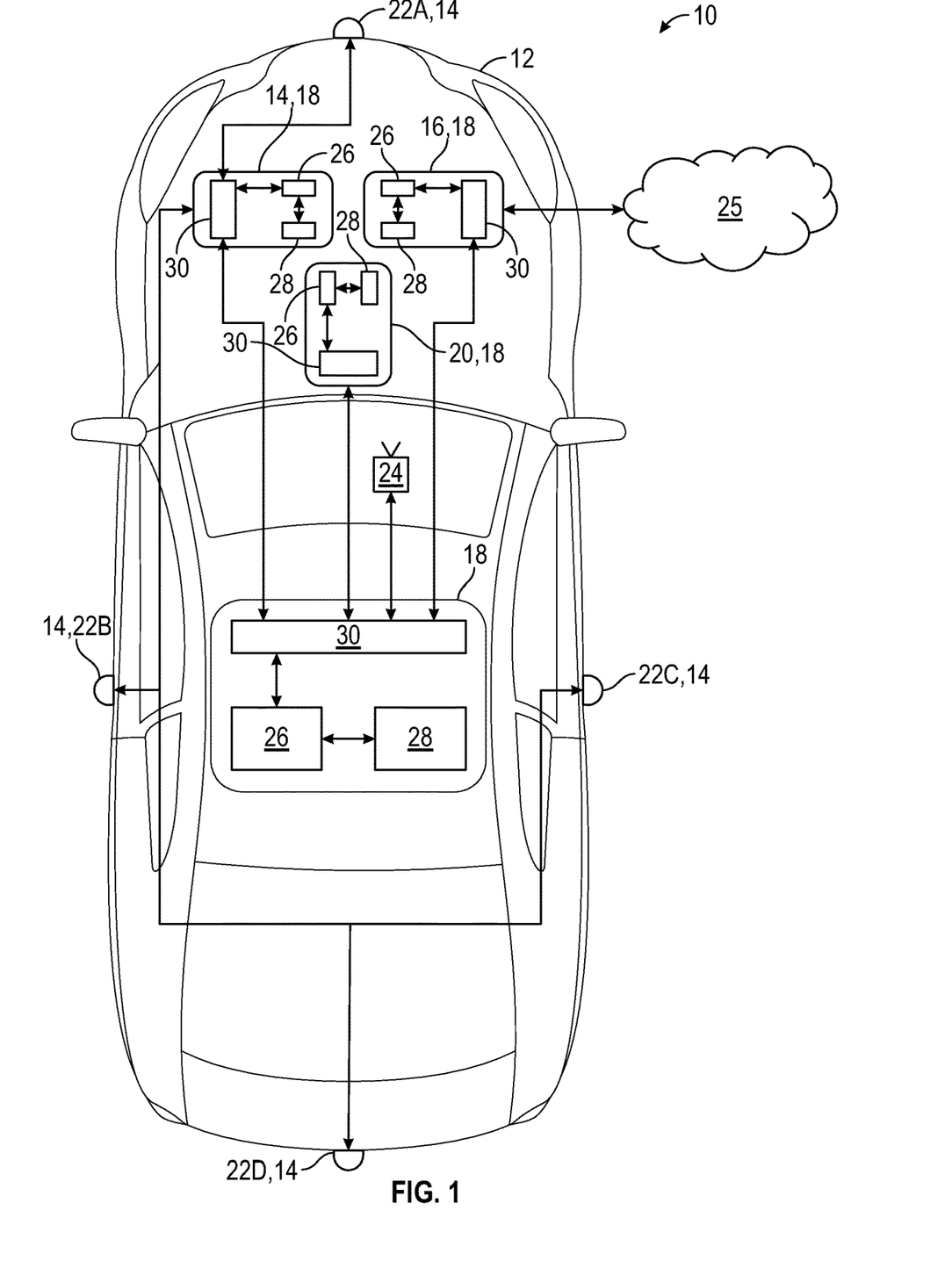
FIG. 1 is a schematic diagram of a system for context-oriented auto park assist in a vehicle according to an exemplary embodiment.

With reference to FIG. 1, a system 10 for context-oriented auto park assist is shown. The system 10 is used with an exemplary vehicle 12. The vehicle 12 is illustrated as a passenger vehicle, however, it should be appreciated that the vehicle 12 may be a truck, sport utility vehicle, van, motor home, air or watercraft, or any other type of vehicle 12 without departing from the scope or intent of the present disclosure. The system 10 runs as an autonomous or semi-autonomous method or application as will be described in greater detail below.

The context-oriented auto park assist system 10 is operable to autonomously park and/or un-park the vehicle 12. The system 10 may have various configurations without departing from the scope or intent of the present disclosure, but generally includes a sensor sub-system 14 and a communication sub-system 16 each in communication with a control module 18. The control module 18 communicates with a vehicle control system 20. The sensor sub-system 14 includes a plurality of sensors 22A-D disposed on, about, or within the vehicle 12. It should be appreciated, however, that while the sensor sub-system 14 is shown with only four sensors 22A-D, the sensor sub-system 14 may include any number of sensors 22 without departing from the scope or intent of the present disclosure. Each of the sensors 22A-D is operable to collect or sense information in a predefined area surrounding the vehicle 12. Information from the sensors 22A-D is communicated to the control module 18. In several examples, the sensors 22A-D may include Light Detection and Ranging (LiDAR) sensor, Radio Detection and Ranging (RADAR) sensors, sound navigation and ranging (SONAR) sensors, ultrasonic sensors, cameras, global positioning system (GPS) sensors, inertial measurement units (IMUs), or other types of proximity and/or location-detecting sensors or the like. The communication sub-system 16 includes a receiver/transmitter operable to receive and/or transmit wired or wireless data to the control module 18 and/or to a human-machine-interface (HMI) 24. In addition, the communication sub-system 16 may communicate with remote systems 25 such as other vehicles through vehicle-to-vehicle (V2V) communication, infrastructure (V2I) communication, and may receive GPS data.

The control module 18 is a non-generalized electronic control device having a preprogrammed digital computer or processor 26, non-transitory computer readable medium or memory 28 used to store data such as control logic, instructions, image data, lookup tables, or the like, and a plurality of input/output (I/O) peripherals or ports 30. The processor 26 is configured to execute the control logic or instructions. The control module 18 may have additional processors or additional integrated circuits in communication with the processor 26, such as perception logic circuits for analyzing sensor data.

The control module 18 communicates with the HMI 24. In an example, the HMI 24 is disposed within the cabin of the vehicle 12 and is preferably a touch screen accessible by an operator of the vehicle 12. However, the HMI 24 may be any visual, haptic, verbal, or gesture control system without departing from the scope or intent of the present disclosure. The HMI 24 may be used to activate and control the context-oriented auto park assist system 10. In addition, the HMI 24 may be used to provide guiding instructions to the occupants of the vehicle 12 that assist the occupants in parking the vehicle 12 in situations where completely autonomous parking is not available. Additionally, the HMI 24 provides warnings to the occupants during manual parking subject to environmental, vehicle 12, or other such constraints as will be discussed in further detail below.

The vehicle control system 20 includes any systems that implement the vehicle functions that autonomously or semi-autonomously aid a driver in parking the vehicle 12. For example, the vehicle control system 20 may include a braking control system, throttle control system, steering control system, body control system, or the like. The vehicle control system 20 may also include any advanced driver assistance system (ADAS) that functions to automate, adapt, or enhance vehicle systems in order to increase vehicle 12 safety and/or operator driving performance. For example, the vehicle control system 20 may include ADAS technologies that alert the driver to potential problems or to avoid collisions by implementing safeguards, such as autonomously controlling the vehicle 12. The vehicle control system 20 may further include ADAS features that enhance certain systems, such as automated lighting, adaptive cruise control, automated braking, or improved blind-spot monitoring and/or elimination using camera technologies. Finally, it should be appreciated that the vehicle control system 20 may be part of the context-oriented auto park assist system 10 without departing from the scope or intent of the present disclosure.

Figure 2:
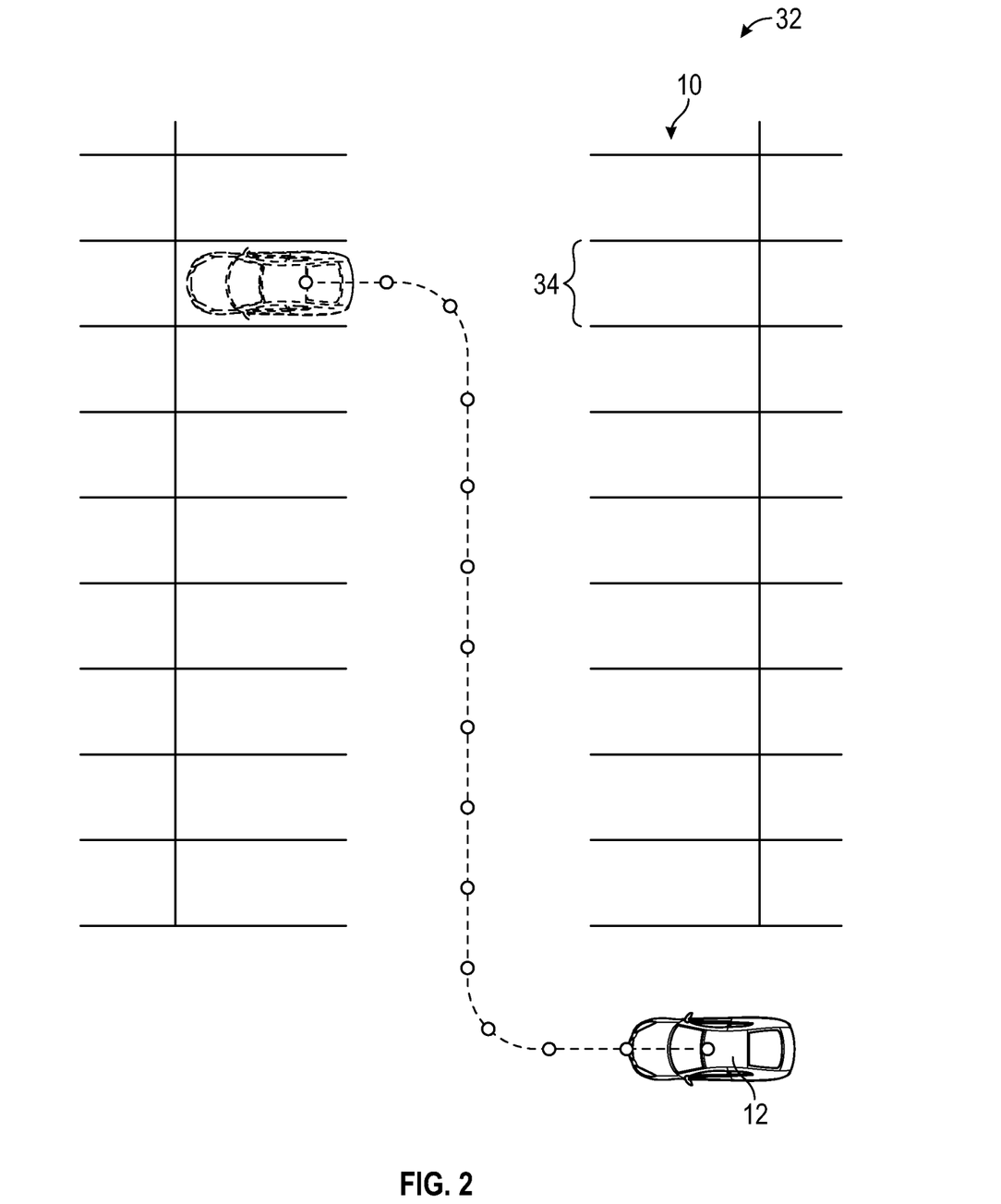
FIG. 2 is a perspective top view of a parking lot in which the system for context-oriented auto-park assist in a vehicle is being used according to an exemplary embodiment.

Referring now to FIG. 2 and with continuing reference to FIG. 1, an exemplary parking area 32 is shown. The parking area 32 includes a plurality of parking spots 34. While the parking area 32 shown includes a plurality of perpendicular-parking spaces, it should be appreciated that the parking area 32 may have any configuration, may be a parking structure, may include street parking, parallel parking, perpendicular parking, angle parking, or variations thereof, and may have any number of parking spots 34 without departing from the scope or intent of the present disclosure.

Figure 3:
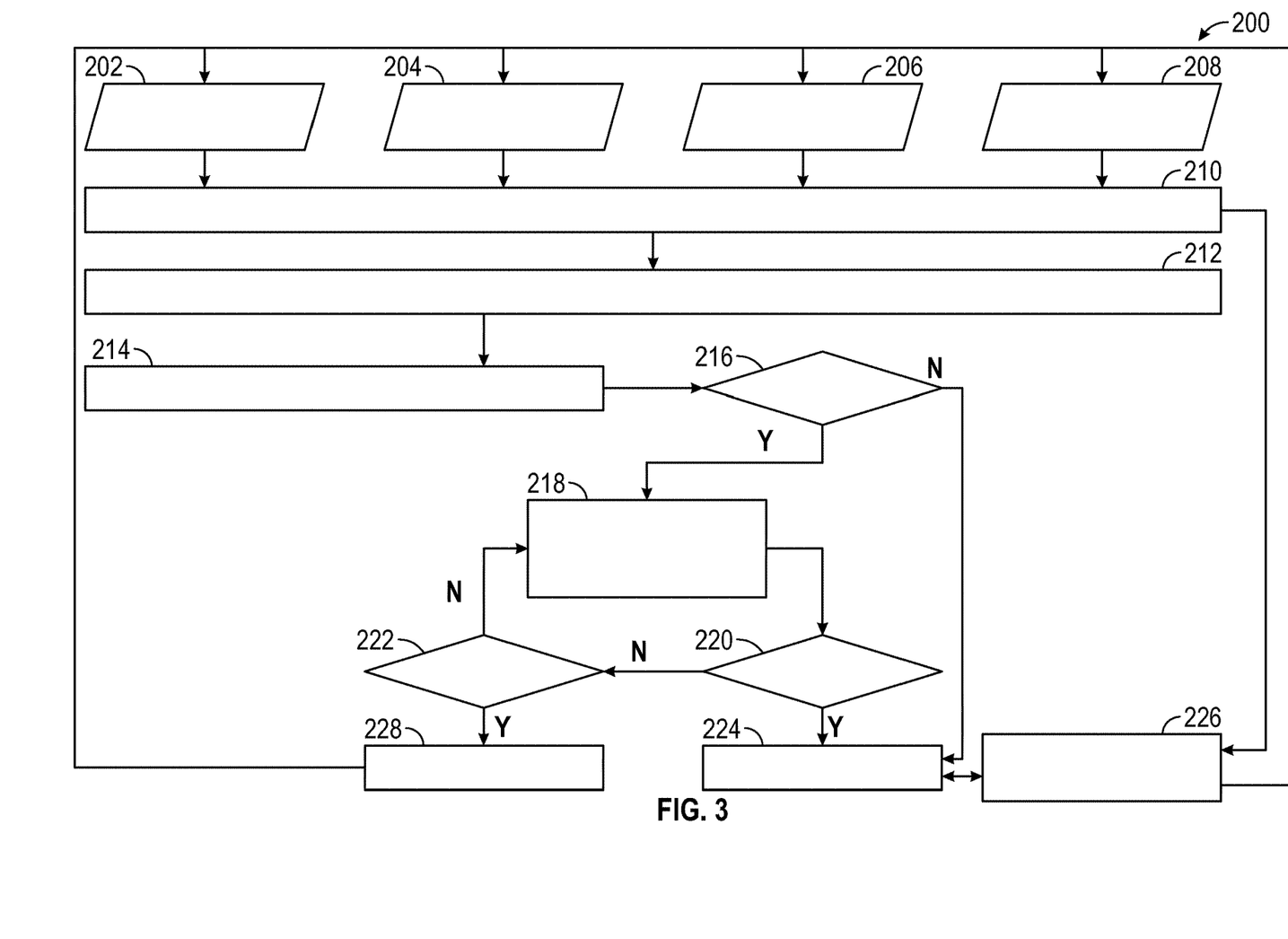
FIG. 3 is a flowchart depicting a method of context-oriented auto park assist in a vehicle according to an exemplary embodiment.

With reference to FIG. 3 and with continuing reference to FIGS. 1 and 2, a method 200 for context-oriented auto park assist is shown. By way of example, the method 200 illustrates parking the vehicle 12 within the parking area 32. However, it should be appreciated that the method 200 may be used similarly when un-parking or retrieving the vehicle 12 from the parking area 32. The method 200 executes a first program code portion stored within the memory 28 that retrieves and/or generates a variety of contextual data at blocks 202, 204, 206, and 208.

Specifically, at block 202, the method 200 generates an occupant context $O_c$. The occupant context $O_c$ is a set of information relating to the occupants of the vehicle 12. In several aspects, the occupant context $O_c$ information may include data extracted by one or more manual and/or automated methods. In an example an occupant of the vehicle 12 may input a variety of occupant context $O_c$ information via an in-vehicle infotainment system such as the (HMI) 24 via touch, voice, gesture inputs, or the like. Additional occupant context $O_c$ information may be retrieved from pre-trip settings in a mobile application on an occupant's mobile device, or stored within a memory of one or more vehicle 12 systems, such as an OnStar™ application, or similar. In further examples, the occupant context $O_c$ information may be retrieved from a computer vision or machine-learning occupant recognition system. The occupant context $O_c$ information itself may include any of a variety of information, such as a physical state of the occupant, i.e. whether the occupant is permanently or temporarily physically challenged, whether the occupant is loading or unloading cargo, and/or whether a passenger is to be dropped off by the vehicle 12. The occupant context $O_c$ information is represented in a structured manner as a list of unique context identifiers and a Boolean value pair, for example:

$$O_c:=[(O_c\_id_1, O_c\_v_1), \ldots (O_c\_id_n, O_c\_v_n)].$$

At block 204, the method 200 retrieves environmental context $E_c$ information from various sensors 22 of the vehicle 12. In some examples, the environmental context $E_c$ information may be more accurately described as environmental context $E_c$ identifiers in the form of a text, image or object identifier. Such environmental context $E_c$ identifiers relate to and indicate: text identifiers such as verbiage on signs or other such text or image detectable by the sensors 22 of the vehicle 12 and/or object identifiers indicating objects detectable by the sensors 22 such as fire hydrants, trash cans, or the like. In several aspects, each environmental context $E_c$ identifier is unique so that each sign with text or object proximate the vehicle 12 has a unique identifier or value. In several aspects, the environmental context $E_c$ information may be represented in a similar manner as the occupant context $O_c$ information. That is, the environmental context $E_c$ information may be represented by unique environmental context $E_c$ identifier and a Boolean value pair, for example:

$$E_c:=[(E_c\_id_1, E_c\_v_1), \ldots (E_c\_id_n, E_c\_v_n)].$$

In an example, the environmental context $E_c$ information may be instantiated based on processed text. In an example of a timed parking spot 34, the Boolean value contains the actual time that parking is allowed in the timed parking spot 34.

At block 206, time and location context $TL_c$ is collected by the system 10. The time and location context $TL_c$ is data obtained from GPS sensors, RADAR sensors, SONAR sensors, LIDAR sensors, ultrasonic sensors, cameras, IMUs, vehicle-to-vehicle (V2V) systems and sensors, vehicle-to-infrastructure (V2I) systems and sensors, or the like. The time and location context $TL_c$ information provides the system 10 with ground truth information regarding the position of the vehicle 12 at a given point in time while the system 10 is operational. In several aspects, the time and location context $TL_c$ information may be obtained from a variety of different sources. In some aspects, time and date information may be obtained from onboard vehicle memory 28 such as memory 28 within the HMI 24 or in-vehicle 12 infotainment system, while the various position sensors 22 described above may retrieve and provide location information. Cloud or edge-based service subscriptions may also be used to provide time and location context $TL_c$ information.

At block 208, host vehicle context $V_c$ information is obtained by the system 10. In several aspects, the host vehicle context $V_c$ information includes vehicle 12 characteristics such as dimensions of the vehicle, vehicle dynamics systems characteristics such as bike hitch or attached trailer and capabilities, and performance characteristics of the vehicle 12. The host vehicle context $V_c$ information may include, for example, turning radius dimensions of the vehicle 12, propulsion system performance characteristics, or the like.

At block 210, the contextual data from each of blocks 202, 204, 206, and 208 is combined. More specifically, once the occupant context $O_c$ information and the environmental context $E_c$ information has been identified, the $O_c$, and $E_c$ information are combined with time and location context $TL_c$ information to generate a combined context vector $C_c$ according to:

$$C_c = (O_c + E_c + TL_c + V_c)$$

The combined context vector $C_c$ is then used at block 212 to prioritize constraints for parking spot 34 selection. That is, at block 202, the system 10 determines occupant information including a quantity of occupants within the vehicle 12, driver information, whether or not physical attachments such as tow hitches or bike racks are present on the vehicle 12, and whether and what obstacles may be present in proximity to the vehicle 12

At block 214, the system 10 searches and identifies candidate parking spots 34. In several aspects, in order to search and identify candidate parking spots 34, the system 10 prompts the vehicle 12 and/or occupants of the vehicle 12 to drive through the parking area 32. At block 216, as the vehicle 12 is driven through the parking area 32, the system 10 utilizes the suite of sensors 22 equipped to the vehicle 12 to scan the parking area 32 for candidate parking spots 34, and when a candidate parking spot 34 is found, the method 200 proceeds to block 218.

At block 218, the method 200 informs vehicle 12 occupants that a candidate parking spot 34 is present and increments an iteration counter by one. In several aspects, the iteration counter is a numerical value stored in memory 28. The method 200 then proceeds to block 220. At block 220, the present value of the iteration counter is compared to a threshold value "N". If the iteration counter is less than the threshold value "N", the method proceeds to block 222 where vehicle 12 occupants are prompted to accept the detected candidate parking spot 34. However, if the iteration counter is equal to the threshold value "N", the method 200 proceeds to block 224, where the context-based auto park assist system 10 informs occupants of the vehicle 12 that the vehicle 12 will be parked manually. Likewise, when at block 216, a candidate parking spot 34 is not found, the method 200 proceeds to block 224 and the system 10 informs occupants of the vehicle 12 to park the vehicle 12 manually. The method 200 then proceeds to block 226 where the system 10 continues to provide environmental context $E_c$-based alerts and/or warnings to occupants of the vehicle 12 as the vehicle 12 is manually parked.

Referring back to block 222 once more, when the occupants do not accept, i.e. reject the candidate parking spot 34, the method 200 proceeds back to block 218 where the system 10 once again informs vehicle 12 occupants and increments the iteration counter upon detection of additional candidate parking spots 34 at block 216. However, when the occupants do accept the candidate parking spot 34, the method 200 proceeds to block 228 where the context-based auto-park assist system 10 engages the vehicle control system 20 to automatically park the vehicle 12. The method 200 may run continuously, cyclically, periodically, or on an occupant-initiated one-time basis without departing from the scope or intent of the present disclosure. Accordingly, the method 200 proceeds from block 222 back to blocks 202, 204, 206, and 208 where contextual information is retrieved again and the method 200 repeats according to the sequence disclosed hereinabove.

Figure 4:
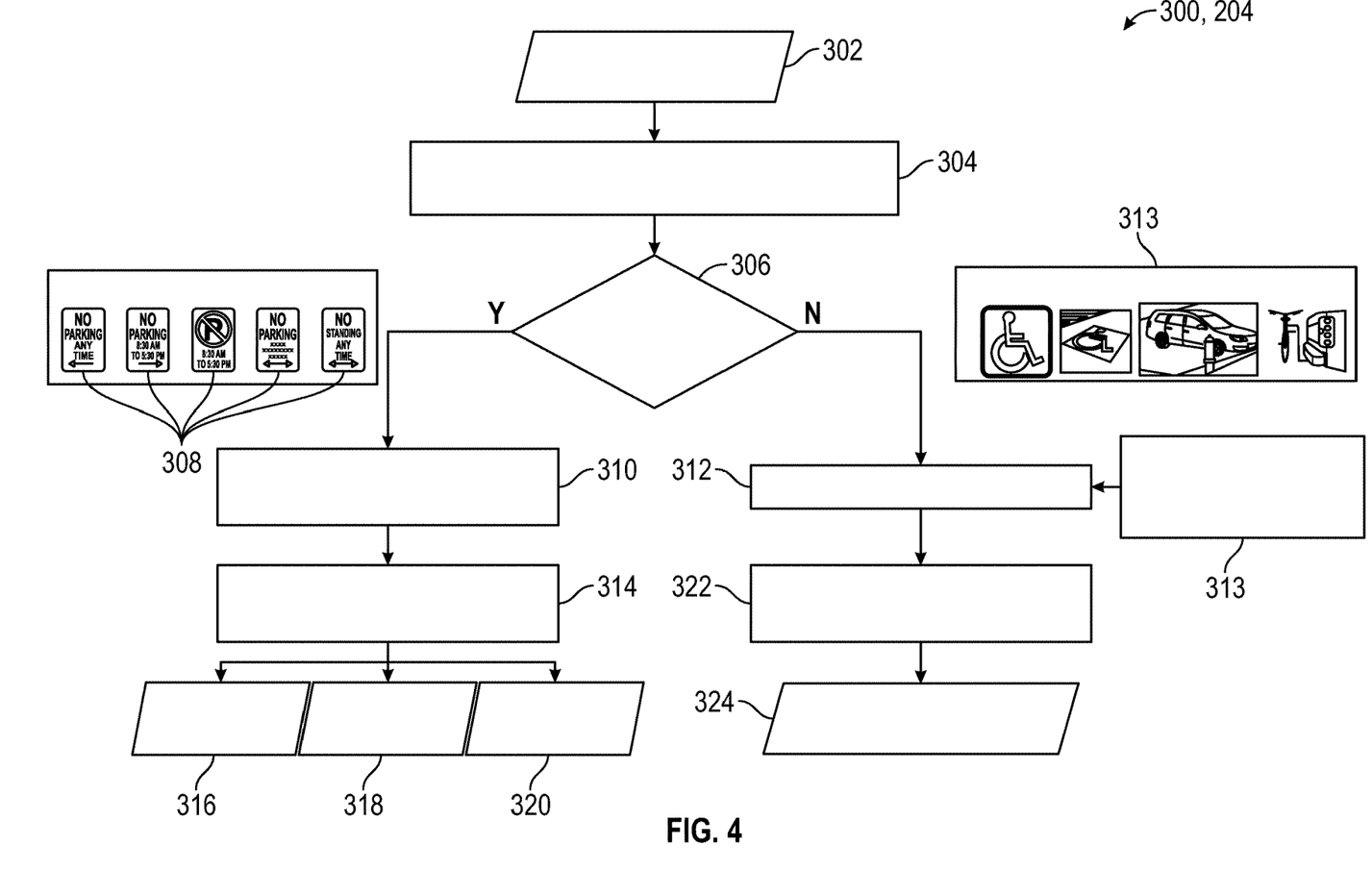
FIG. 4 is a flowchart depicting portion of the method depicted in FIG. 3, showing a method of environmental context generation according to an exemplary embodiment.

Turning now to FIG. 4, and with continuing reference to FIGS. 1-3, a portion of the method 200 of FIG. 3 is shown in further detail. Specifically, FIG. 4 depicts an $E_c$ method 300 of environmental context $E_c$ identification carried out at block 204 in FIG. 3. The $E_c$ method 300 begins at block 302 where data from multiple sensor 22 sources is retrieved as described previously. The $E_c$ method 300 then proceeds to block 304 where objects are detected utilizing a Deep Neural Network (DNN). The DNN may be an of a variety of different neural network architectures and designs without departing from the scope or intent of the present disclosure. In an example, the DNN may include an Efficient and Accurate Scene Text detector (EAST) neural network, or other such natural language processing algorithms that may be off-the-shelf or custom-designed and trained DNNs. The DNN may be trained in advance of active use on the vehicle 12 and in the presently described system 10, for example to account for specific physical parameters of the vehicle 12 including a presence or lack of a trailer hitch, bike rack, or the like.

The $E_c$ method 300 subsequently proceeds to block 306 and determines whether there is readable text within a bounding box 308 within a given road or parking area 32 sign. When there is text within the bounding box 308, the method 300 proceeds to block 310, and when no text exists within the bounding box 308, the method proceeds to block 312.

At block 310, the $E_c$ method 300 extracts text from the bounding boxes 308 using the DNN language processing algorithm, such as EAST before proceeding to block 314. At block 314, the $E_c$ method 300 classifies the extracted text using the DNN. The classified text is then output to the vehicle 12 occupant at blocks 316, 318, and 320. For example, at 316 when text indicating handicap-accessible or handicap-reserved parking spots 34 is present on a given sign, the $E_c$ method 300 displays via the HMI 24 in the vehicle 12, a notification that there is a handicap-reserved parking spot 34 is present before proceeding with any more of the context-oriented auto-park method 200 described previously. Likewise, at block 318, when the $E_c$ method 300 detects signage indicating no parking is allowed is detected, the $E_c$ method 300 displays via the HMI 24, a notification to the vehicle 12 occupants that no parking is allowed in the signed area. The no-parking notification may be further classified or clarified with additional information found in the signage including hourly parking limits, or the like. Similarly, at block 320, when the $E_c$ method 300 detects signage indicating parking is restricted is identified, the $E_c$ method 300 displays, via the HMI 24, a notification to vehicle 12 occupants that there are restrictions on parking proximate the sign. For example, the $E_c$ method 300 may display a notification that parking is restricted only to visitors, no standing is allowed, or the like.

Referring once more to block 312, when no text is detected within the bounding box 308, the $E_c$ method 300 classifies detected objects. For example, the detected objects may include other vehicles 12, trees, curbs, berms, stanchions, posts, cones, fire hydrants, or any other detected objects in or proximate to detected parking spots 34. Additional constraints 313 may be imposed at block 312 as well. For example, when the vehicle 12 is equipped with a trailer hitch, a bike rack, or other such vehicle accessories that effectively alter physical dimensions or maneuvering capabilities of the vehicle 12, these constraints are factored into determinations of which parking spots 34 may be realistic candidates for the context-oriented auto-park assist system 10 disclosed herein.

The $E_c$ method 300 then proceeds to block 322 where the system 10 analyzes restrictions on the parking spots 34 detected. More specifically, at block 322, the $E_c$ method 300 utilizes a DNN with a language and/or image-processing algorithm, such as the EAST algorithm, to process data from the various sensors 22 to determine whether or not and what restrictions may exist in relation to a particular parking spot 34. The restrictions may include, for example, markings within or external to marked boundaries of the parking spot 34 including handicapped markings on the ground, colored or marked curbs indicating whether or not parking is allowed, the presence of fire hydrants, or the like. From block 322, the $E_c$ method 300 proceeds to block 324 where occupants of the vehicle 12 are notified of restrictions on the parking spot 34. For example, the $E_c$ method 300 may display a notification that parking is restricted only to visitors, handicapped persons, no parking is allowed, employee parking only is allowed, a fire hydrant is within a predefined distance of the parking spot 34, no standing is allowed, or the like.

From blocks 320 and 324, the $E_c$ method 300 proceeds back to block 302, where sensor 28 data is acquired once more. The $E_c$ method 300 may run continuously, periodically, iteratively, and/or at the request of an occupant of the vehicle 12 without departing from the scope or intent of the present disclosure. It should be further appreciated that the $E_c$ method 300 occurs within block 204 of the method 200 of FIG. 3. While not shown specifically in the figures, it should be understood that a similar sub-method as the $E_c$ method 300 may also performed in relation to the occupant context $O_c$ at block 202.

A system 10 and method 200 for context oriented auto park assistance of the present disclosure offers several advantages. These include the ability to function in a platform agnostic manner, utilizing a wide variety of different sensors 22 and sensor systems, to improve accuracy and robustness of automatic and/or auto-park assisted manual parking systems, and reduce complexity and reduces the potential for user, occupant, and automatic parking errors, while providing additional redundant ease of access and safety features.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for context-oriented auto park assist in a vehicle comprising:
    a sensor sub-system;
    a communication sub-system;
    a vehicle control system;
    each of the sensor sub-system, the communication sub-system, and the vehicle control system having:
        one or more control modules having a processor, a memory, and input/output (I/O) ports, the I/O ports of each of the sensor sub-system, and the communication sub-system in communication with the vehicle control system; the control modules executing program code portions stored in the memory, the program code portions comprising:
        a first program code portion that generates an occupant context, wherein the occupant context further comprises: physical characteristics of vehicle occupants, a physical state of the occupants, a permanently or temporarily physically challenged state of the occupants, a cargo loading or unloading status of the vehicle, and quantities of occupants within the vehicle;
        a second program code portion that generates an environmental context from information received by the sensor sub-system, wherein the environmental context further comprises: text identifiers including verbiage on signs, and on surfaces within a predefined area surrounding the vehicle;
        a third program code portion that generates a time and location context from information received by the communication sub-system and the sensor sub-system; and
        a fourth program code portion that generates a vehicle context from predefined vehicle characteristics,
        a fifth program code portion that generates a combined context vector by combining the occupant context, the environmental context, the time and location context, and the vehicle context;
        a sixth program code portion that scans a parking area for candidate parking spots, wherein the candidate parking spots are determined by applying the combined context vector as the vehicle is driven through the parking area;
        a seventh program code portion that informs vehicle occupants of a presence of candidate parking spots; and
        an eighth program code portion that, upon receiving an input from the vehicle occupants, performs one or more automated driver assistance system (ADAS) actions through the vehicle control system to park the vehicle.

2. The system of claim 1, wherein the sensor sub-system further comprises:
    one or more sensors disposed on the vehicle, the one or more sensors comprising:
        Light Detection and Ranging (LIDAR) sensors, Radio Detection and Ranging (RADAR) sensors, Sound Navigation and Ranging (SONAR) sensors, cameras, ultrasonic sensors, inertial measurement units (IMUs), and Global Positioning System (GPS) sensors, vehicle-to-vehicle (V2V) systems and sensors, and Vehicle-to-Infrastructure (V2I) systems and sensors.

3. The system of claim 2, wherein the third program code portion further comprises:
    program code that generates the time and location context from:
    time and date information stored within vehicle memory; and
    location information received from one or more of the RADAR sensors, SONAR sensors, LIDAR sensors, ultrasonic sensors, cameras, IMUs, V2V systems and sensors, and V2I systems and sensors.

4. The system of claim 1, wherein the first program code portion further comprises:
    program code that receives occupant data from one or more of:
    a manual occupant input to a human-machine interface (HMI) via touch inputs, gesture inputs; and
    an automatic occupant input comprising: pre-trip settings in a mobile application on an occupant's mobile device, pre-trip settings stored within memory of the control module, and information retrieved from a computer vision or machine-learning occupant recognition system.

5. The system of claim 4 wherein the seventh program code portion further comprises:
    generating a prompt to vehicle occupants, wherein the prompt is displayed on the HMI, and the prompt offers occupants opportunities to park the vehicle within one or more candidate parking spots; and
    wherein upon receiving an occupant input to select a candidate parking spot, the system performs an eighth program code portion to park the vehicle; and
    upon not receiving an occupant input to select a candidate parking spot, or upon not detecting a candidate parking spot, the system increments an iteration counter and continues to scan the parking area.

6. The system of claim 5, wherein the eighth program code portion further comprises:
   engaging the vehicle control system to perform an ADAS action to park the vehicle or to assist vehicle occupants in manually parking the vehicle by providing environmental context based alerts to the occupants as the occupants manually park the vehicle.

7. The system of claim 1, wherein the second program code portion further comprises:
   program code that retrieves environmental context information from sensors equipped to the sensor sub-system of the vehicle, wherein the environmental context information further comprises:
      object identifiers indicating a presence of physical objects within the predefined area surrounding the vehicle.

8. The system of claim 7, wherein the predefined vehicle characteristics comprise:
   physical dimensions of the vehicle, vehicle dynamics system characteristics and capabilities, and performance characteristics of the vehicle.

9. The system of claim 8, wherein the sixth program code portion further comprises:
   a program code portion that applies constraints to the combined context vector, wherein the constraints comprise:
      text identifiers, object identifiers, predefined vehicle characteristics, and physical dimensions of accessories attached to the vehicle.

10. A method for context-oriented auto park assist in a vehicle, the method comprising:
    utilizing one or more control modules having a processor, a memory, and input/output (I/O) ports, the control modules executing program code portions stored in the memory, the program code portions:
    generating an occupant context, wherein the occupant context further comprises: physical characteristics of vehicle occupants, a physical state of the occupants, a permanently or temporarily physically challenged state of the occupant, and quantities of occupants within the vehicle;
    generating an environmental context from information received by a sensor sub-system of the vehicle, wherein the environmental context further comprises: text identifiers including verbiage on signs, and on surfaces within a predefined area surrounding the vehicle;
    generating a time and location context from information received by a communication sub-system of the vehicle and the sensor sub-system;
    generating a vehicle context from predefined vehicle characteristics;
    generating a combined context vector by combining the occupant context; the environmental context, the time and location context, and the vehicle context;
    scanning a parking area for candidate parking spots, wherein the candidate parking spots are determined by applying the combined context vector as the vehicle is driven through the parking area;
    informing vehicle occupants of a presence of candidate parking spots; and
    upon receiving an input from the vehicle occupants, performing one or more automated driver assistance system (ADAS) actions through a vehicle control system to park the vehicle, wherein the I/O ports of each of the sensor sub-system, and the communication sub-system are in communication with the vehicle control system.

11. The method of claim 10, wherein generating an environmental context from information received by a sensor sub-system of the vehicle further comprises:
    collecting sensor data from one or more sensors of the sensor sub-system, the one or more sensors comprising: Light Detection and Ranging (LIDAR) sensors, Radio Detection and Ranging (RADAR) sensors, Sound Navigation and Ranging (SONAR) sensors, cameras, ultrasonic sensors, inertial measurement units (IMUs), and Global Positioning System (GPS) sensors, vehicle-to-vehicle (V2V) systems and sensors, and Vehicle-to-Infrastructure (V2I) systems and sensors.

12. The method of claim 11, further comprising:
    generating time and location context from: time and date information stored within vehicle memory; and
    location information received from one or more of the RADAR sensors, SONAR sensors, LIDAR sensors, ultrasonic sensors, cameras, IMUs, V2V systems and sensors, and V2I systems and sensors.

13. The method of claim 10, further comprising receiving occupant data from one or more of:
    a manual occupant input to a human-machine interface (HMI) via touch inputs, gesture inputs; and
    an automatic occupant input comprising: pre-trip settings in a mobile application on an occupant's mobile device, pre-trip settings stored within memory of the control module, and information retrieved from a computer vision or machine-learning occupant recognition system.

14. The method of claim 13, wherein receiving occupant data further comprises:
    receiving physical characteristics of the vehicle occupants, cargo loading or unloading status of the vehicle, and quantities of occupants.

15. The method of claim 13, further comprising:
    generating a prompt to vehicle occupants, wherein the prompt is displayed on the HMI, and the prompt offers occupants opportunities to park the vehicle within one or more candidate parking spots; and
    wherein upon receiving an occupant input to select a candidate parking spot, the system performs one or more automated driver assistance system (ADAS) actions through a vehicle control system to park the vehicle; and
    upon not receiving an occupant input to select a candidate parking spot, or upon not detecting a candidate parking spot, the system increments an iteration counter and continues to scan the parking area.

16. The method of claim 15, further comprising:
    engaging the vehicle control system to perform an ADAS action to park the vehicle or to assist vehicle occupants in manually parking the vehicle by providing environmental context based alerts to the occupants as the occupants manually park the vehicle.

17. The method of claim 10, further comprising:
    receiving environmental context information from sensors equipped to the sensor sub-system of the vehicle, wherein the environmental context information further comprises:
       object identifiers indicating a presence of physical objects within the predefined area surrounding the vehicle.

18. The method of claim 17, wherein generating a vehicle context from predefined vehicle characteristics, further comprises:

retrieving physical dimensions of the vehicle, vehicle dynamics system characteristics and capabilities, and performance characteristics of the vehicle; and applying constraints to the combined context vector, wherein the constraints comprise:

text identifiers, object identifiers, predefined vehicle characteristics, and physical dimensions of accessories attached to the vehicle.

19. A system for context-oriented auto park assist in a vehicle comprising:

a sensor sub-system having one or more sensors disposed on the vehicle, the one or more sensors comprising:

Light Detection and Ranging (LIDAR) sensors, Radio Detection and Ranging (RADAR) sensors, Sound Navigation and Ranging (SONAR) sensors, cameras, ultrasonic sensors, inertial measurement units (IMUs), and Global Positioning System (GPS) sensors, vehicle-to-vehicle (V2V) systems and sensors, and Vehicle-to-Infrastructure (V2I) systems and sensors;

a communication sub-system;

a vehicle control system;

each of the sensor sub-system, the communication sub-system, and the vehicle control system having:

one or more control modules having a processor, a memory, and input/output (I/O) ports, the I/O ports of each of the sensor sub-system, and the communication sub-system in communication with the vehicle control system; the control modules executing program code portions stored in the memory, the program code portions comprising:

a first program code portion that generates an occupant context from occupant data including one or more of:

a manual occupant input to a human-machine interface (HMI) via touch inputs, gesture inputs; and an automatic occupant input comprising: pre-trip settings in a mobile application on an occupant's mobile device, pre-trip settings stored within memory of the control module, and information retrieved from a computer vision or machine-learning occupant recognition system, wherein the occupant data includes physical characteristics of vehicle occupants, cargo loading or unloading status of the vehicle, and quantities of occupants, wherein the occupant context further comprises: physical characteristics of the vehicle occupants, a physical state of the occupants, a permanently or temporarily physically challenged state of the occupant, and quantities of occupants within the vehicle;

a second program code portion that generates an environmental context from information detected by sensors equipped to the sensor sub-system of the vehicle, wherein the environmental context information further comprises:

text identifiers including verbiage on signs, and on surfaces within a predefined area surrounding the vehicle; and object identifiers indicating a presence of physical objects within the predefined area surrounding the vehicle a third program code portion that generates a time and location context from time and date information stored within vehicle memory and location information received from one or more of the RADAR sensors, SONAR sensors, LIDAR sensors, ultrasonic sensors, cameras, IMUs, V2V systems and sensors, and V2I systems and sensors;

a fourth program code portion that generates a vehicle context from predefined vehicle characteristics including: physical dimensions of the vehicle, vehicle dynamics system characteristics and capabilities, and performance characteristics of the vehicle;

a fifth program code portion that generates a combined context vector by combining the occupant context, the environmental context, the time and location context, and the vehicle context;

a sixth program code portion that scans a parking area for candidate parking spots, wherein the candidate parking spots are determined by applying constraints to the combined context vector as the vehicle is driven through the parking area, wherein the constraints comprise:

text identifiers, object identifiers, predefined vehicle characteristics, and physical dimensions of accessories attached to the vehicle;

a seventh program code portion that informs vehicle occupants of a presence of candidate parking spots by generating a prompt to vehicle occupants, wherein the prompt is displayed on the HMI, and the prompt offers occupants opportunities to park the vehicle within one or more candidate parking spots; and wherein upon receiving an occupant input to select a candidate parking spot, the system performs an eighth program code portion to park the vehicle; and upon not receiving an occupant input to select a candidate parking spot, or upon not detecting a candidate parking spot, the system increments an iteration counter and continues to scan the parking area; and upon receiving an input from the vehicle occupants, the eighth program code portion performs one or more automated driver assistance system (ADAS) actions through the vehicle control system to park the vehicle or assists vehicle occupants in manually parking the vehicle by providing environmental context based alerts to the occupants as the occupants manually park the vehicle.

* * * * *